March 21, 1933.  W. W. FOSTER  1,902,360
PUMP ROD STUFFING BOX MOUNTING
Filed Nov. 23, 1931
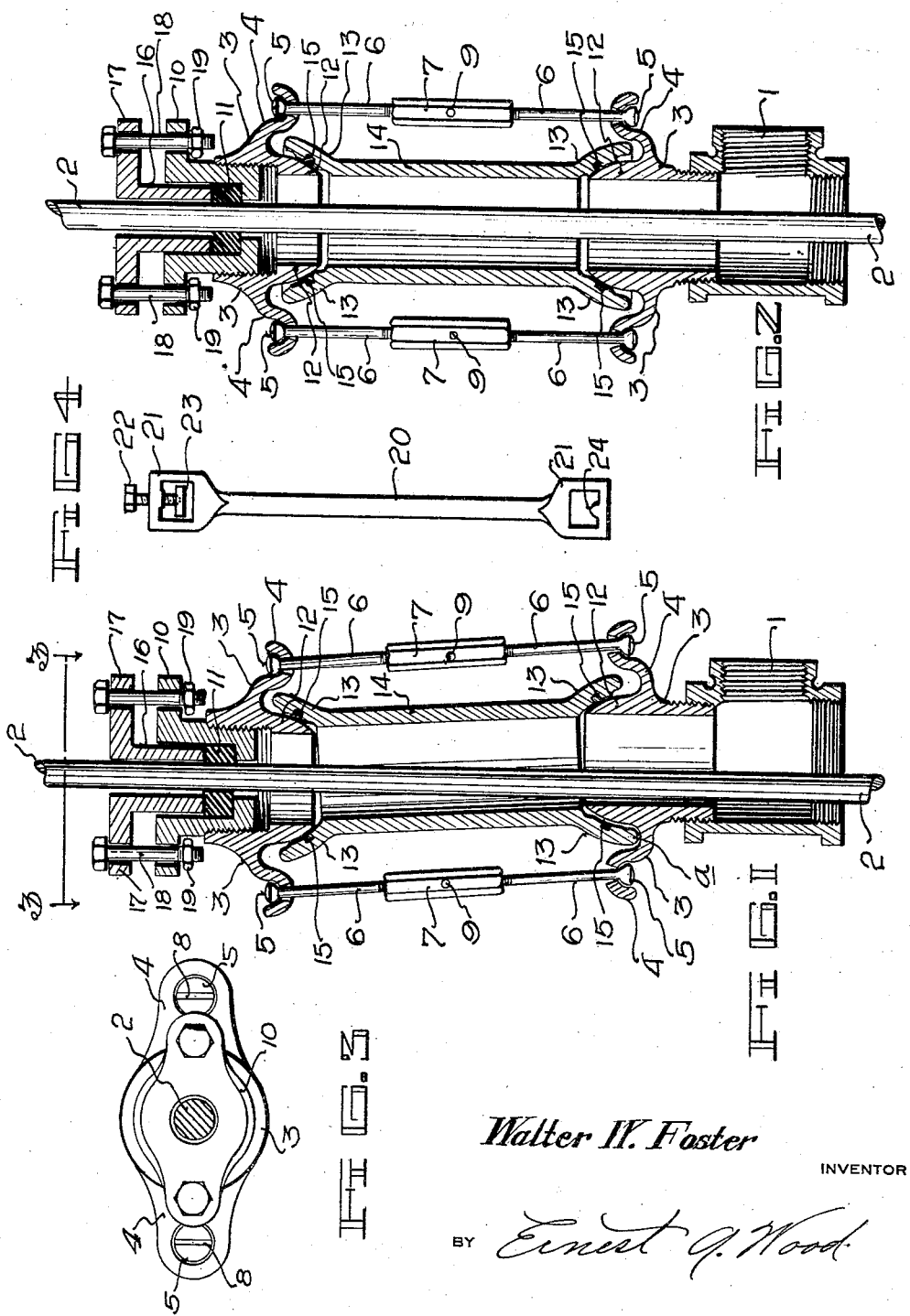
Walter W. Foster
INVENTOR
BY Ernest J. Wood
ATTORNEY Patented Mar. 21, 1933

1,902,360

UNITED STATES PATENT OFFICE

WALTER W. FOSTER, OF WICHITA FALLS, TEXAS

PUMP ROD STUFFING BOX MOUNTING

Application filed November 23, 1931. Serial No. 576,765.

This invention relates to well pumping equipment and it has particular reference to a pump rod packing unit.

The principal object of the invention is to provide a packing unit or stuffing box mounting which is so constructed that it will yield to the movements of a reciprocating pump rod. The mounting supports the stuffing box in such manner that the pump rod, in passing therethrough will not cause undue friction upon the packing, hence insuring greater periods of usefulness and obviating the necessity of replacing the packing in the stuffing box.

Conventionally, reciprocation of the pump rod in the pumping of oil and other wells exerts lateral stresses upon the pump rod packing and as the packing becomes worn and impaired by frictional wear, the rod is allowed to contact with the metallic tubing and is accordingly roughened, which causes further wear upon the packing and frequently results in crystallization and possible breakage of the pump rod. This condition is quite disastrous in that the rod assembly is dropped into the hole, recovery of which is usually expensive procedure.

Broadly, the invention seeks to provide a stuffing box mounting, the peculiar construction of which will allow the stuffing box to remain in a strictly horizontal plane over the pump rod assembly irrespective of the movements of the pump rod in normal operation. In being thus constrained to move, the pump rod is allowed to reciprocate through the stuffing box without binding and without undue lateral stress, which is usually the direct cause of wear upon the packing and ultimate disfiguration of the polished or pump rod. The invention, in being constructed to limit the lateral displacement of the stuffing box, caused by the movements of the pump rod, maintains the pump rod in a true perpendicular plane and prevents contact thereof with the walls of the tubing and accordingly minimizes or eliminates entirely the possibility that the pump rod will become roughened or otherwise impaired by reason of its frictional engagement as explained.

With the foregoing objects as paramount, the invention has particular reference to its salient features of construction and arrangement of parts which will become manifest as the description proceeds, taken in connection with the accompanying drawing, wherein:—

Figure 1 is an elevational view in axial section showing the displaced position of the stuffing box and mounting at the approximate center of the arc described by the walking beam in the execution of its stroke.

Figure 2 is a similar view showing the normal position of the invention.

Figure 3 is a view on lines 3—3 of Figure 1, and

Figure 4 is a detail view of one form of parallel arm employed for connecting the units of the invention together.

Continuing with a more detailed explanation of the drawing, 1 designates a T which is threaded upon the tubing whereby to provide a lateral outlet for the fluid elevated. The pump or polished rod 2 is shown fragmentarily and suspends the pump rod assembly in the well and to the upper end of which the walking beam of the pump jack is connected to impart reciprocative movements thereto. An exteriorly threaded flange 3 is fitted into the T 1 in the manner shown in Figures 1 and 2, integral with which are oppositely extended projections 4. Particular attention is directed to the peculiar construction of the projections 4, which are turned to provide a recess to receive the rounded ends 5 of rods 6. The relationship above described permits universal movement of the rods 6, except as constrained by the peculiar adaptation of the rods to maintain perpendicularity between certain elements of the invention as will be presently explained.

It will be observed that the rods 6 are in sections and are joined together through the medium of a turnbuckle 7 in order that they may be adjusted as to length.

To make this adjustment easier to accomplish, the ends 5 of the rod 6 are grooved as indicated by the character 8 so that a screw driver or similar tool may be inserted to hold the rods 6 against rotation while the turnbuckle 7 is rotated to lengthen or shorten the distances between the ends of the rods. An aperture 9 is provided in the turnbuckle 7 for the reception of a suitable tool.

Since the upper flange of the stuffing box mounting differs only slightly from the flange 3, previously mentioned, the same reference characters are employed to designate the same parts in this element of the invention as have been used in describing the flange 3. The one exception mentioned above resides in the fact that instead of being exteriorly threaded, the upper flange of the invention is interiorly threaded to receive the flanged sleeve 10 which contains the packing 11. The upper flange is otherwise the same as the lower flange and both flanges are provided with beveled or semi-spherical ends 12 whose shapes correspond with the bell ends 13 of a rigid cylindrical member 14 as a means for holding the end flanges 3 in positive spaced relationship. The peculiar relationship between the ends of the spacing member 14 and the flanges 3 is in the nature of a ball and socket, which functions to allow the upper flange to move with respect to the lower flange 3, which latter remains fixed, in view of its rigid connection with the well tubing through the medium of the T member 1.

Although movement is prevented, the upper flange 3 is constrained to lie always in a horizontal plane or a parallel plane with respect to the companion flange, due to the presence of the parallel rods 6, which connect the two flanges together.

An annular groove is made in the upset end of the spacer member 14 to receive a packing ring 15. One of such packing rings is provided at either end of the spacer member 14 in order to insure against leakage between the moving members since it is one of the important features of the invention to prevent leakage of fluid by reason of impaired packing, which frequently causes a fire hazard and a sloppy condition immediately surrounding the well.

Entering the flange 10 and in direct contact with the packing 11 therein is a sleeve 16 having an integral flange 17 and is held against the packing in the member 10 by means of a series of bolts 18. The bolts, as apparent in Figures 1 and 2, are inserted through apertures in the flanges 10 and 17 of the two elements constituting the packing assembly about the pump rod 2. Nuts 19 carried by the bolts 18 enable the flange 17 to be drawn down tightly to cause the sleeve 16 integral therewith to bear upon and expand the packing 11 against the pump rod 2 in order to maintain a reasonably tight joint at this point.

With particular reference to Figure 4, showing a modified form of parallel rod, it is pointed out that the rod 20 shown in this figure, instead of being in sections, is of sufficient length to reach from the projections 4 carried by the flanges 3 and integral with either end of which is a stirrup 21. It will be recalled that length adjustment of the rod 6 in the preceding description was accomplished through the medium of the turnbuckle 7. In the present instance, adjustment is made by means of a set screw 22 at the upper end of the rod 20, which bears against the projections 23, the latter being representative of the projections 4, previously described.

At the lower end of the rod, within the stirrup 21 is a ball 24, which is received in the recess defined by the peculiar formation of the projections 4, shown in Figures 1 and 2. The rod is thus held securely in position yet allows the same a degree of displacement of the upper flange of the structure as in the preceding arrangement.

It has been stated in the preamble and in the course of the description of the invention that the most satisfactory and desirable condition is to maintain the movable flange in a parallel plane with the fixed flange during reciprocating motion of the pump rod 2. It is obvious from the foregoing description and from the annexed drawing that the parallel rods 6 or 20, as the case may be, will insure against other than parallel movement in a strictly horizontal plane of the upper flange 3 as it is actuated by reason of the movements of the pump rod. The movable relationship between the two flanges and the spacer member is such as to aid rather than to resist the movement of the stuffing box as it adjusts itself to the movements of the pump rod in a strictly horizontal plane.

At the lower portion of Figure 1, it will be noted that the lower end of the spacer member 14, designated at $a$ may impinge against the inner surface of the lower flange. This arrangement affords a means to limit the displacement of the spacer member 14 and consequently the stuffing box. In so limiting the movement of the members as described, the pump rod is kept from engagement with the walls of the tubing. In other words, the pump rod 2 is constrained to travel perpendicularly, hence there is no lateral stress or binding action between the packing and the rod.

Manifestly, the construction shown is capable of considerable modification and such modification as is considered within the scope and meaning of the appended claims is also considered within the spirit and intent of the invention.

What is claimed is:

1. A pump rod stuffing box mounting including relatively movable flanges and a tubular spacing member, parallel rods arranged to maintain said flanges in positive parallel relationship whereby to constrain said stuffing box to move in a horizontal plane during reciprocating movements of said pump rod.

2. A pump rod stuffing box mounting including a stationary flange and a movable flange, said latter flange having means for supporting said stuffing box, an elongated tubular spacing member, parallel rods disposed on opposed sides of said spacing member and loosely connecting said flanges together whereby to constrain said movable flange to repose on a strictly horizontal plane irrespective of the movements of said pump rod.

3. A pump rod stuffing box mounting including a stationary flange and a movable flange carrying said stuffing box each having semi-spherical end portions, a spacing member having concaved ends to conformably receive the ends of said flanges and arranged for rocking movement between said flanges to hold the latter in positive spaced relationship, means for maintaining the axes of said flange in a relatively parallel plane during movements of said pump rod and means for limiting the movement of said movable flange.

4. A mounting for pump rod packers including upper and lower flanges, secured together for movement and having semi-spherical portions through which said pump rod is arranged to pass, a cylindrical spacing member having upset ends conformably engaging the semi-spherical portions of said flanges whereby to be capable of rocking movement when said flanges are relatively displaced, adjustable means for holding said flanges to constrain the upper flange to move only in a horizontal plane and means for limiting the relative movement of said latter flange.

5. A mounting for pump rod packers including upper and lower flanges, one of which is arranged to carry said packer, each of said flanges having semi-spherical portions, a cylindrical spacing member having flanged ends embracing said semi-spherical portions whereby to provide for displacement of said upper flange, means for constraining said upper flange to move in a plane strictly parallel to said lower flange during movement thereof and means to limit said movement.

6. A pump rod stuffing box mounting including a stationary flange having a semi-spherical end portion and a movable flange having a semi-spherical end portion directed toward the end of said stationary flange, an elongated tubular spacing member whose ends are shaped to conformably embrace the ends of said flanges and having packing means between their points of engagement and means connecting said flanges together and to constrain the same to move in a strictly horizontal plane during movements of said pump rod.

In testimony whereof I affix my signature.

WALTER W. FOSTER.